United States Patent [19]

Willems et al.

[11] 4,390,483

[45] Jun. 28, 1983

[54] METHOD FOR MAKING UREA PRILLS AND UREA PRILLS OBTAINED BY APPLYING THIS METHOD

[75] Inventors: Michael H. Willems; Jan W. Klok, both of Geleen, Netherlands

[73] Assignee: Unie Van Kunstmestfabrieken, B.V., Utrecht, Netherlands

[21] Appl. No.: 248,439

[22] Filed: Mar. 27, 1981

[30] Foreign Application Priority Data

Mar. 29, 1980 [NL] Netherlands .......................... 8001876

[51] Int. Cl.³ ............................................. B01J 2/04
[52] U.S. Cl. .......................................... 264/7; 264/14; 264/8
[58] Field of Search ................................ 264/7, 8, 14

[56] References Cited

U.S. PATENT DOCUMENTS

| | | | |
|---|---|---|---|
| 3,255,036 | 6/1966 | Kramer et al. | 264/7 |
| 3,450,804 | 6/1969 | Bocckino et al. | 264/14 |
| 3,795,504 | 3/1974 | Wengeler | 264/14 |
| 3,836,611 | 9/1974 | Marrovic | 264/14 |
| 4,076,773 | 2/1978 | Mahl, Jr. et al. | 264/14 |

*Primary Examiner*—James R. Hall

[57] ABSTRACT

A method for producing urea prills by passing molten droplets of substantially water free urea downwardly through a cooling zone countercurrent to a cooling gas. A dispersion of crystalline particles is maintained in at least a portion of the cooling zone, the crystalline particles having average dimensions of between 2 and 10 microns and being dispersed in the cooling gas in a quantity of between about 8 and 25 mg per m³ of the cooling gas at ambient temperature and pressure, whereby urea prills, built up of relatively small crystallites with random orientation having improved impact strength are formed.

9 Claims, 3 Drawing Figures

METHOD FOR MAKING UREA PRILLS AND UREA PRILLS OBTAINED BY APPLYING THIS METHOD

BACKGROUND OF THE INVENTION

This invention relates to an improved method for prilling urea by allowing molten droplets of a substantially water-free urea melt to fall downwardly through a cooling zone, countercurrent to a cooling gas in which a seeding material has been dispersed.

It is known from U.S. Pat. No. 3,450,804, that urea prills can be made by spraying a substantially water-free urea melt downwardly through a cooling zone countercurrent to a cooling gas in which solid urea particles, or particles of some other seeding material, have been dispersed. In this known method, the principal object of which is a substantial reduction of the amount of absorbed moisture in the prilled product, the seeding material is present in the form of very finely divided solid particles, preferably as a fog or in colloidal form. Optimum results are said to be obtained by using finely divided particles in the form of a fog of urea decomposition products produced by contacting solid urea with a red hot metal plate.

It has been found that in applying this known method, a limited number of large crystallites will form in the cooling droplets from the surface inwards, which crystallites are oriented in essentially the same direction. As the droplets cool, the outer skin, which is formed first, is locally sucked inwards as the interior portion of the droplet cools and solidifies, resulting in the formation of cavities such as shown in FIG. 1. As a consequence, the prills thus formed have a low impact strength, and are thus susceptible to pulverization and dust formation during transport and processing of the prills. This disadvantage is particularly apparent during bulk transport of the urea prills, which mode of transport is being increasingly utilized.

It is, therefore, an object of this invention to provide an improved method for prilling urea whereby urea prills of increased impact strength and less susceptibility to crushing are formed.

SUMMARY OF THE INVENTION

It has not been found that the abovementioned disadvantages can be avoided, and that prills without cavities, and having a random orientation of relatively small crystallites, can be formed if there is maintained in the cooling zone, a cooling gas having dispersed therein crystalline particles having average dimensions of between 2 and 10 microns which are present in a quantity of between about 8 and 25 milligrams per cubic meter of the cooling gas at ambient temperature and pressure. The terms 'dimension' and 'particle size' as used hereinafter to indicate the size of the crystalline particles designate the mean diameter of said particles calculated from their mass and specific gravity.

It is important for the proper functioning of the improved method that the requisite quantity of the crystalline particles have a dimension of at least 2 microns. It has been found that particles having dimensions smaller than 2 microns have no effect as a seeding material in increasing the impact strength of the prills formed, because these small particles tend to be carried around the falling drops of molten urea by the cooling gas, rather than coming into contact with them. As well the fog of decomposition products obtained by contacting the urea with a hot metal plate as the urea in the colloidal state have particle sizes of less than 1 micron. Thus very small particles will have hardly any chance of reaching a urea droplet. Particles of larger dimensions dispersed in a gas stream will leave the stream owing to their larger inertia when approaching a urea droplet and will come into contact with the surface of the droplet. Hence the number of impacts of particles of dimensions less than about 2 microns with the droplets is very low as compared with the case that particles with larger dimensions are used. Effective seeding is only obtained when a certain number of impacts between the seeding particles and a urea droplet is achieved. Particles with dimensions larger than 10 microns can be utilized, but such particles have no greater effect than particles within the 2 to 10 micron range. Use of larger particles, however, makes it necessary to use a larger quantity by weight of seeding materials. Preferably, the crystalline particles used as the seeding material in accordance with the present invention will have average dimensions in the range of 4 to 8 microns.

The quantity or concentration of seeding material to be present in the cooling zone, in addition to being dependent upon the particle size of the seeding material, also depends to a lesser degree on the size of the droplets of molten urea sprayed into the cooling zone. Thus, it has been found for making urea prills having a diameter of between 1 and 3 mm, good results are obtained if a quantity of 8–25 mg of the seeding material having an average particle size of between 2 and 10 microns is present per cubic meter of cooling gas. This is equivalent to between about $0.01 \times 10^9$ and $4.5 \times 10^9$ particles of the seeding material per cubic meter of cooling gas at ambient temperature and pressure. The lower value corresponds to a seeding material wherein all particles have a diameter of 10 microns, and the higher value relates to a seeding material in which all particles have a diameter of 2 microns. For a given prilling installation the amount of cooling gas will vary with the ambient temperature and consequently the velocity of the gas stream will vary too. However, the amount of seeding particles per $m^3$ of cooling gas is kept about constant. As the number of seeding particles that impacts the urea droplets is only very small with respect to the total number of particles present, the lower or higher velocity of the gasstream will not affect the seeding. Practically the total amount of seeding material that is fed into the cooling zone is also discharged therefrom.

As the seeding material, preference is given to the use of urea particles. These can be obtained by grinding urea prills or urea crystals to the appropriate size. In order to insure good grinding and good flow properties of the particles formed, an anticaking agent can be added to the crystalline urea to be ground. Suitable anticaking agents include calcium, magnesium, zinc and aluminum salts of higer fatty acids, clay, talc, calcite, and sepiolite. A preferred anticaking agent which has been found to be particularly suitable is calcium stearate.

The urea melt to be sprayed can be obtained by evaporating urea solutions or by melting urea crystals. If a melt is sprayed which has been obtained by evaporating urea solutions or by melting urea crystals, preference will be given to melting in the neighbourhood of the spraying facility, for instance at the top of the prilling tower, in order to prevent the formation of biuret as far as possible. The crystals are then passed, preferably pneumatically, to the top of the prilling tower, there separated from the transport gas by means of a cyclone and subsequently melted. The conditions under which the cyclone is operated can be chosen to be such that the transport gas discharged form the cyclone contains particles with average dimensions of substantially 2-10 microns. After discharge, this transport gas, containing the fine urea particles dispersed in it, can wholly or partly be added to the cooling gas fed to the cooling zone, so that a smaller quantity of seeding material obtained by grinding, or none at all, need be fed.

In addition to fine urea particles, other crystalline substances may also be used as the seeding material within the scope of the improved method. Examples of such other substances include chalk, gypsum, and potassium chloride. When using seeding materials other than urea, the urea prills obtained are, however, contaminated with these foreign substances and may be less suitable for certain purposes.

During the course of solidification of the molten urea drops into prills, the size of the crystallites formed depends upon the manner and the rate of cooling. The impact strength of prills built up of relatively small crystallites having a random orientation is considerably greater than that of prills built up of large crystallites which have substantially the same orientation. In this connection it is to be noted that the prills obtained in the process described in U.S. Pat. No. 3,450,804 are built up of plate-like crystals, which are formed as large monocrystals grown in the same direction. These prills are resistant to attrition and crushing, but have a low impact strength.

It has been found that the formation of small crystallites in a prill is promoted when the molten urea drop, at the crystallization temperature, comes into contact with a large number of fine particles of the seeding materials. These fine particles act as crystal seeds.

The relation between the number of crystal seeds contacting the molten urea droplet and the shock or impact resistance of the resultant urea prill has been determined by experiment for prills with an average diameter ($d_{50}$) of about 2 mm (i.e., 50% of the prills have a diameter equal to or larger than 2 mm) with a maximum spread in diameter of plus or minus 40%. The results of this experiment are shown in FIG. 2.

In FIG. 2, the impact strength of the resultant prill has been plotted on the ordinate, and the number of seeding places per prill has been plotted on the abscissa. The impact strength of the prills plotted in this figure have been determined by pneumatically shooting a quantity of prills at a speed of 20 m/sec. and at an angle of 45° against a steel plate. The impact strength of the prills is the percentage of prills not fractured during this treatment.

From this figure, it can be seen that in order to obtain an impact strength of 70% at least 10 seeding places per prill ($d_{50}=2$ mm) are required. Preferably, an impact strength of at least 80% is obtained. For this purpose, a minimum of about 20 seeding places per prill ($d_{50}=2$ mm) is required. In practice, this means that for each 1000 kg of urea melt to be prilled, approximately 0.125-0.375 kg of urea seeding particles having an average particle size of 2-10 microns is required to obtain prills with a fairly good to good impact strength. However, it has also been found that, as the relative humidity of the cooling gas increases, a larger quantity of seeding material is required in order to maintain the desired impact strength. However, the quantities of seeding material mentioned above will suffice for prilling at the highest relative humidity of air that may occur.

As the cooling gas, any gas which is inert with respect to urea can be utilized such as, for instance, air, nitrogen, and carbon dioxide. Most generally in practice, however, air is used as the cooling gas.

The seeding material may be supplied to the cooling zone from 1 or more locations, and is homogenously dispersed therein to the extent possible. However, in order to maintain the dispersion of fine urea seeding particles in the cooling zone, the water vapor pressure of the cooling air must be smaller than or equal to the water vapor pressure of the urea particles at the temperature of the cooling air. If the water vapor pressure of the cooling air is greater than that of the urea particles, the particles will absorb water vapor from the gas. If the water vapor pressure of the air is substantially greater, the urea particles may even dissolve so that the seeding effect will be completely lost. Therefore, the location at which the seeding material is introduced into the cooling zone must be chosen such that the cooling air at that location is heated to such a degree that the water vapor pressure in the air is smaller than or equal to that of the seeding material. This location must be chosen taking into account the highest water vapor content of the cooling air that would be experienced under local atmospheric circumstances.

The air flow utilized to carry the seeding material into the cooling zone must also have a low water vapor pressure. To this end, this air may, for instance, be pre-dried or heated to, for instance, 50° C.

The urea prills obtained as a result of applying the improved method of this invention are substantially built up of small crystallites having a random orientation. These prills have a significantly improved impact strength as compared to urea prills prepared in accordance with previously known methods. The formation of cavities as shown in FIG. 1 is avoided. Owing to the random orientation of the small crystallites, the surface of the prills is somewhat less smooth than that of the prills without the random orientation of the crystallites as can be seen in FIG. 3. Also the prills have a good crushing strength.

DETAILED DESCRIPTION OF A PREFERRED EMBODIMENT

Figure 1:
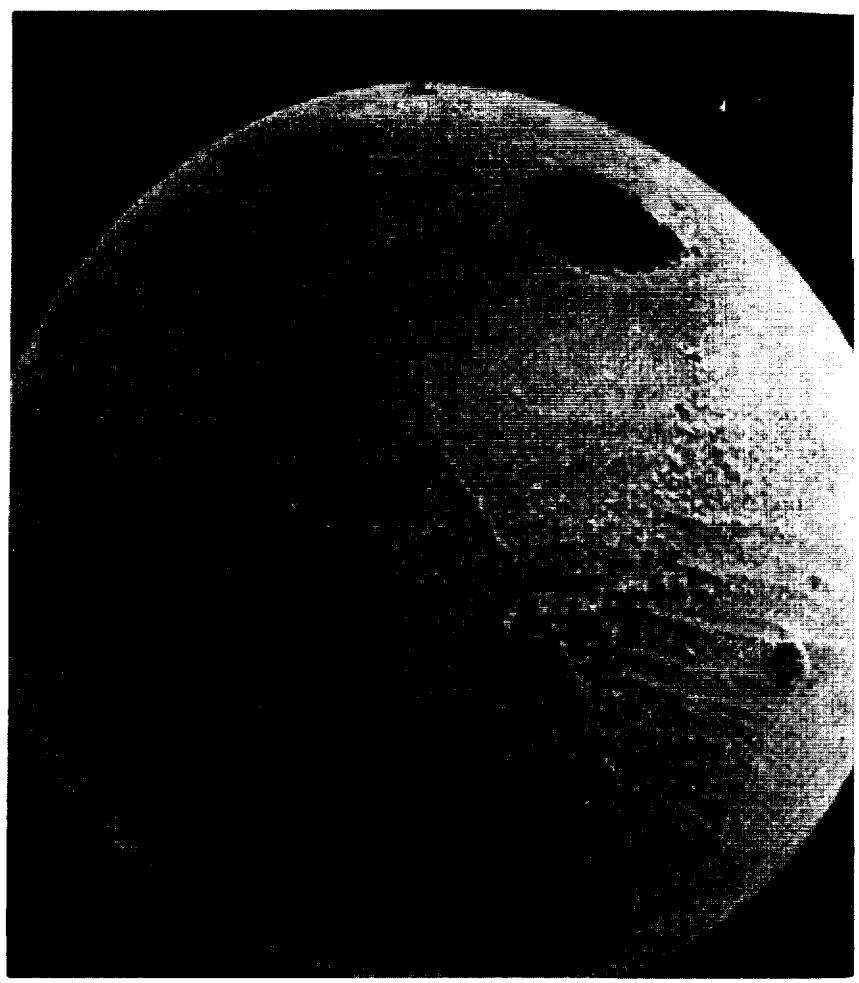
FIG. 1 is a photomicrograph (magnification 80 times) of a urea prill formed in accordance with previously known prilling methods, showing a cavity which was formed during the cooling and solidification of the prill.
Figure 2:
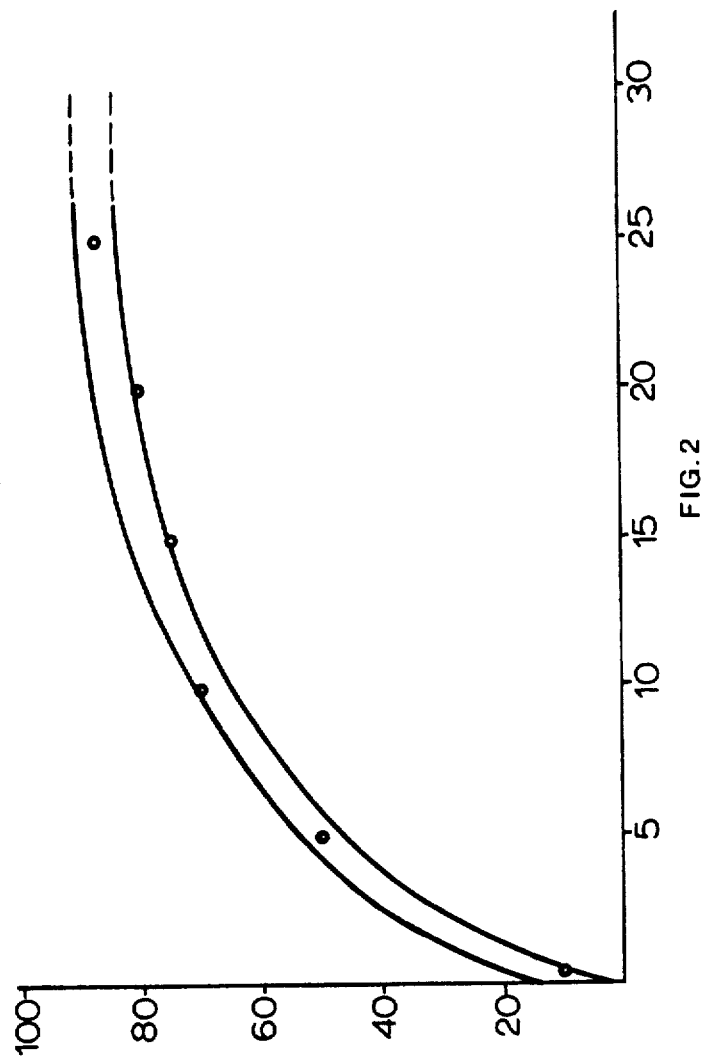
FIG. 2 is a graph plotting resultant impact strength of urea prills (ordinate) as a function of the number of seeding places per prill (abscissa) for urea prills having an average diameter ($d_{50}$) of about 2 mm, as discussed in greater detail above.
Figure 3:
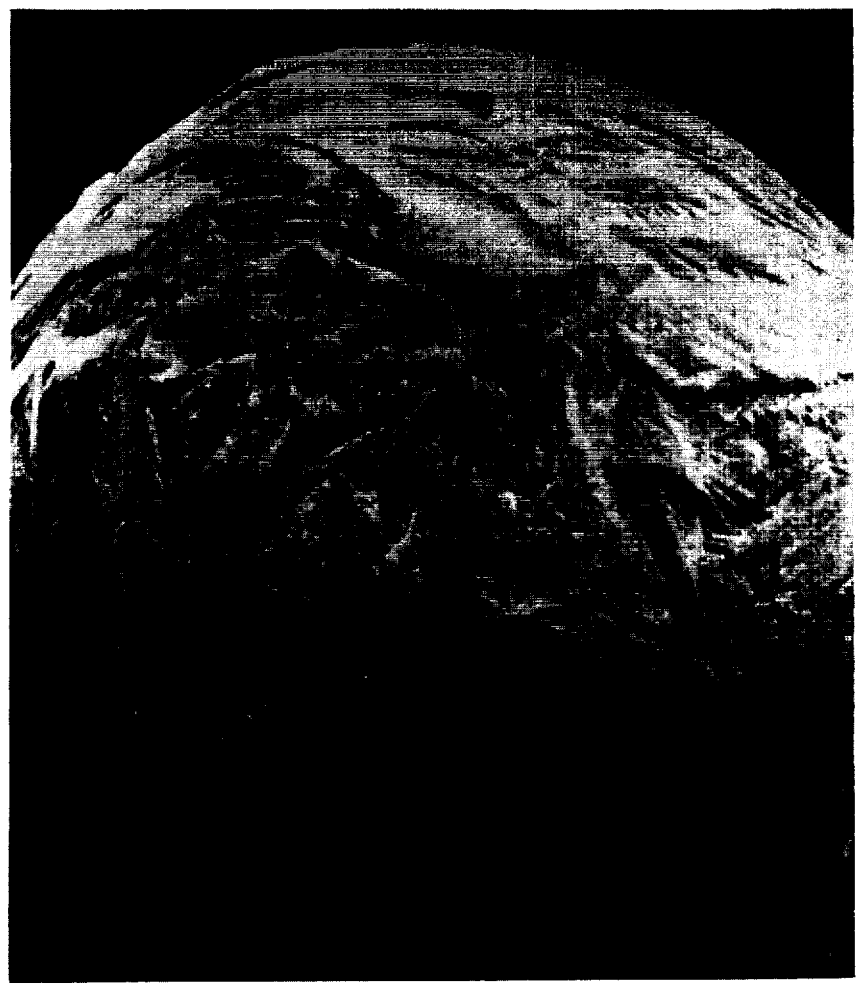
FIG. 3 is a photomicrograph (magnification 80 times) of a urea prill made in accordance with the improved method of this invention.

A preferred embodiment of the invention will be illustrated by means of the following example.

In a prilling tower having a height of 52 meters, 40,000 kg per hour of 99.8% urea melt having a temperature of 138° C. was sprayed by means of a rotating prilling bucket in which the hole diameter was about 1.3 mm. At four locations in the circumference of the prilling tower, a mixture of air and crystalline urea seeding particles were blown into the cooling tower through pipes by means of an ejector, and dispersed in the cooling water tower as homogenously as possible. The average dimension of the seeding particles was 4 microns, with a spread of 2–10 microns. The particles had been obtained by grinding urea prills to which 3% by weight of calcium stearate had been added.

The seeding particles were transported to the prilling tower in pipes at a velocity of 35 m/sec., and the transport air had a relative humidity of 30%. The locations of the feed apertures for introducing the seeding material into the prilling tower were 20 meters below the prilling bucket.

Cooling air was supplied to the bottom of the cooling tower and flowed upwardly through the cooling tower countercurrent to the sprayed urea melt. This cooling air was introduced at a rate of 600,000 m$^3$/hour, and had a temperature at the inlet of 20° C.

A series of tests or experiments were conducted wherein the quantity of seeding material and/or the relative humidity (RH) of the cooling air was varied. After each test, a sample was taken and the impact strength (IS) of the resultant urea prills was determined. The results of these tests are tabulated in the following Table:

TABLE

| Test no. | RH (%) | quantity seedling mat. (kg/hr) | IS (%) |
|---|---|---|---|
| 1 | 94 | 5.0 | 62 |
| 2 | 96 | 7.4 | 72 |
| 3 | 93 | 9.7 | 78 |
| 4 | 90 | 11.9 | 78 |
| 5 | 63 | 3.1 | 78 |
| 6 | 63 | 5.9 | 83 |
| 7 | 59 | 8.8 | 85 |
| 8 | 64 | 13.6 | 87 |
| 9 | >90 | — | 10–20 |
| 10 | <90 | — | 50 |

From this Table it can be concluded that in order to reach an equivalent impact strength, a larger quantity of seeding material is required where the cooling air has a high relative humidity rather than a low relative humidity. Experiments Nos. 9 and 10 show that, without the addition of any seeding material, the impact strength of the resultant urea prills is significantly smaller than the impact strength of prills prepared with the addition of seeding material in accordance with the present invention.

What is claimed is:

1. In a method for prilling urea wherein molten droplets of substantially water free urea are cooled to solidification by passing said droplets downwardly through a cooling zone countercurrent to a cooling gas in which a seeding material has been dispersed, the improvement comprising maintaining in at least a portion of said cooling zone a cooling gas having dispersed therein crystalline particles, which are capable of initiating urea crystallization, having dimensions of between 2 and 10 microns in a quantity of between about 8 and 25 mg/m$^3$ of said cooling gas at ambient temperature and pressure.

2. The method of claim 1 wherein said particles have average dimensions of between 4 and 8 microns.

3. The method of claim 1 or 2 wherein said particles are crystalline urea.

4. The method of claim 3 additionally including the step of grinding crystalline urea to obtain at least a portion of said crystalline particles.

5. The method of claim 4 wherein a particulate anti-caking agent is added to said crystalline urea before said urea is ground.

6. The method of claim 5 wherein said anticaking agent is selected from the group consisting of fatty acid salts of calcium, magnesium, zinc, or aluminum, clay, talc, calcite, and sepiolite.

7. The method of claim 1 or 2 wherein said crystalline particles are fed into said cooling zone at one or more locations and are substantially homogenously dispersed therein.

8. The method of claim 7 wherein said cooling gas is air.

9. The method of claim 8 wherein said particles and said cooling air have a water vapor pressure, and the location of the feed of said particles into said cooling zone is selected so that the water vapor pressure of the cooling air at such location is no higher than the water vapor pressure of said particles at the temperature of said cooling air at said location.

* * * * *